Figure 1:
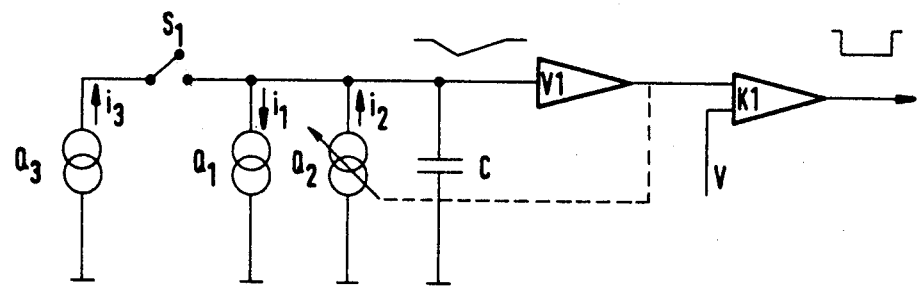

United States Patent [19]

Baader

[11] 4,205,781
[45] * Jun. 3, 1980

[54] ARRANGEMENT FOR SYNCHRONIZING AN INFORMATION READING DEVICE WITH THE SPEED OF AN INFORMATION MEDIUM

[75] Inventor: Helmut Baader, Nabburg, Fed. Rep. of Germany

[73] Assignee: Interroll Fordertechnik GmbH & Co. K.G., Dhunn, Fed. Rep. of Germany

[*] Notice: The portion of the term of this patent subsequent to Nov. 28, 1995, has been disclaimed.

[21] Appl. No.: 914,423

[22] Filed: Jun. 12, 1978

Related U.S. Application Data

[62] Division of Ser. No. 726,009, Sep. 23, 1976, Pat. No. 4,127,770.

[30] Foreign Application Priority Data

Oct. 2, 1975 [DE] Fed. Rep. of Germany ....... 2544119

[51] Int. Cl.² .................... G06K 7/016; G06K 7/00
[52] U.S. Cl. .................... 235/474; 235/436
[58] Field of Search ............... 235/462, 436, 463, 466, 235/474; 340/146.32; 250/555, 566, 568; 360/44, 51

[56] References Cited

U.S. PATENT DOCUMENTS

| 3,720,927 | 3/1973 | Wolf | 360/44 |
|---|---|---|---|
| 3,744,025 | 7/1973 | Bilgutay | 235/436 |
| 3,959,625 | 5/1976 | Kashio | 235/466 |
| 3,987,278 | 10/1976 | Elzakker et al. | 235/462 |

Primary Examiner—Daryl W. Cook
Attorney, Agent, or Firm—Anthony J. Casella

[57] ABSTRACT

An arrangement for synchronizing an information reading device with the speed of an information medium containing a set of a predetermined number of characters in fixed spatial relation, and being movable relative to the device. The arrangement includes a timing means having an output signal which is a predeterminable multiple of an input signal which is proportional to the speed at which a leading character passes the reading device.

7 Claims, 3 Drawing Figures

ARRANGEMENT FOR SYNCHRONIZING AN INFORMATION READING DEVICE WITH THE SPEED OF AN INFORMATION MEDIUM

This is a division of application Ser. No. 726,009, filed Sept. 23, 1976, now U.S. Pat. No. 4,127,770, issued Nov. 20, 1978.

The invention relates to a synchronising arrangement and in particular to an arrangement for synchronising an information reading device with the speed of an information medium which is movable relative to the reading device and on which are arranged, in predetermined number and in fixed spatial position, the individual characters of a set of characters which comprises a predetermined number of individual characters.

It is generally known to read serially information characters from any desired information medium such as a magnetic tape, a punched card, a punched tape or a similar information medium and to convert the serially read information into a parallel representation by electronic methods. For, as a rule, a device for series-parallel conversion is simpler and involves less expenditure than the use of a correspondingly large number of reading heads for the parallel reading of information. In order to increase reliability in service it is almost impossible to avoid representation of the information in a code which enables a checking of the information read for possible reading errors. In the case of serial reading of information characters, a possible means for carrying out a check comprises counting the number of characters belonging to the total of the information and checking whether the sum of all the characters scanned corresponds to a predetermined target number. Additionally, it is normally necessary to indicate the end of a reading cycle by an appropriate signal thereby confirming that a complete information unit or complete set of information characters has been scanned.

Where the information media run pas the scanning device at a uniform and known speed, the recording of the passage of the leading character can be used to trigger a timing element which is so arranged that at the expiration of a predetermined time set to correspond to the recording of all characters belonging to a complete set of information characters, the timing element releases a readiness signal which indicates the complete recording of a given information. In addition, during the running time of the timing member the input gate of a meter which has beforehand been reset to zero could be opened. Such a meter could be used to ascertain the number of characters recorded so that a comparison with the target number of characters could be made.

However, when the individual information character sets are taken past the scanning device at speeds which, though constant within the sets, differ greatly from one set to another and/or individual characters do not reflect because of dirt, the mode of procedure stated above is no longer effective. In practice it can happen that the speeds at which the individual information sets are taken past the scanning device differ greatly with the ratio of different speeds reaching of the order of 1:100.

It is an object of the present invention to provide an arrangement of the above-mentioned type which provides, even in the case of greatly differing speeds with which information sets are taken past a reading device, a particularly reliable and accurate ascertainment of the point in time at which the last information character in a set of information has passed the reading device and whether reading of the set of information characters has been completed, so that the arrangement does not erroneously count into a preceding set of characters a character of an ensuing set of characters.

The present device provides an arrangement for synchronising an information reading device with the speed of an information medium which is movable relative to the reading device and in which medium are arranged, in predetermined number and in fixed spatial position, a fixed number of individual characters which constitute a set of characters, comprising a timing means for supplying an output signal which is a predeterminable multiple of an input signal and means for providing an input signal proportional to the speed at which a leading character comprising the first character of the set of characters, or a character put in front of the set of characters, runs past the reading device.

The arrangement according to the invention is particularly useful in the synchronisation of an information reading device with the speed of a coding reflector, moved relative to the reading device, in a photoelectronically controlled conveying, sorting, inventory or similar system. Such a coding reflector generally has a base plate which contains a set of coded characters and is secured to an article which is transported on a conveying, sorting or similar system.

According to the basic idea of the inventor, the run-through time of the leading character in a set of characters is used as a basis for a gate-opening time of a character meter, the total gate-opening time always being a fixed multiple of the run-through time of the leading character, so that in this way there occurs an automatic adaption of the reading device to the respective speeds of the individual information sets running past it.

In practice it is assumed that the total number of characters in a set of characters and the spatial arrangement of the individual characters are known and fixed.

According to the invention, the run-through time of the leading character which is the first of a set of characters or a character inserted in front of the set of characters is used to provide an indication of the time the entire set of characters needs to run through the reading device. When, therefore, according to the basic idea of the inventor, the total time needed is ascertained from the time measurement during the run-through of the leading character, it can be assumed that upon expiration of the total run-through time ascertained in this manner, the entire set of characters has passed through the reading device. After the passage of the first character through the reading device there need therefore, according to the invention, be carried out merely a time measurement to indicate the end of the run-through of the entire set of characters. Either an analogue or a digital time-measuring device may be used, the device being, in each case set with an input obtained from the run-through time of the leading character.

Thus by means of the present invention, it is possible to avoid the additional expenditure for a scanning device which would otherwise have been required for detecting the end set of characters before the information read could be evaluated and the reading device prepared for reading the next set of information characters. At the same time the invention provides an exceptionally simple yet accurate method for synchronising a reading device with the transportation speed of character taken past the reading device.

Figure 3:
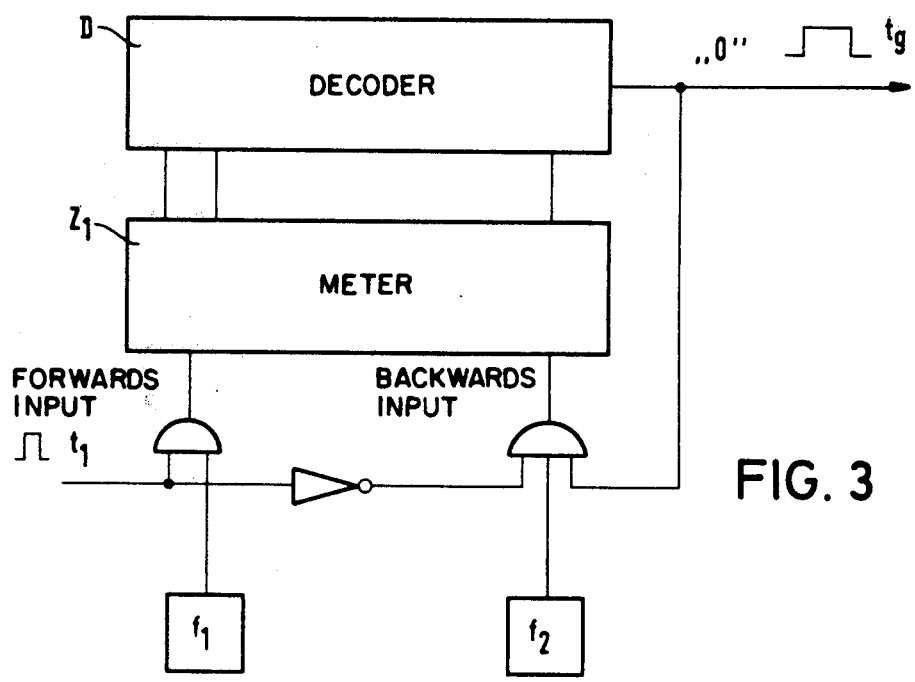
Figure 2:
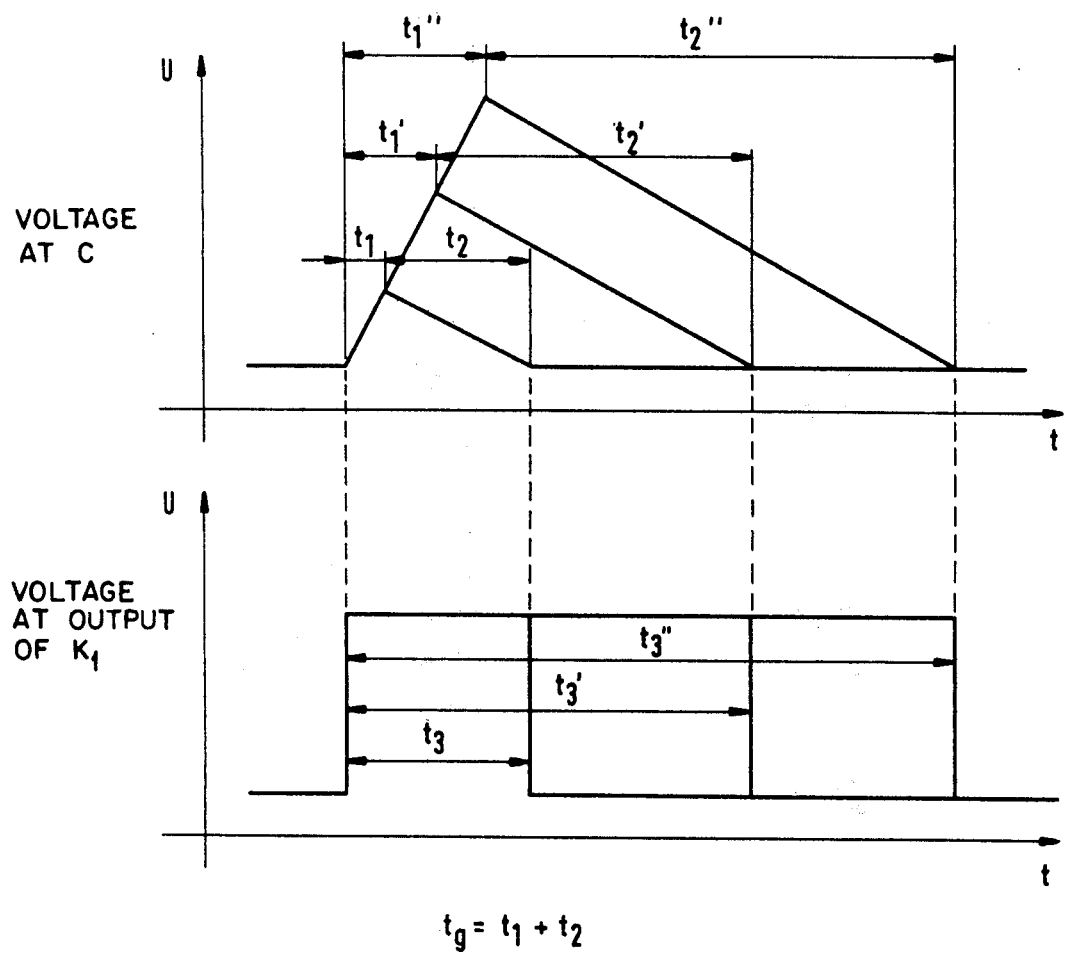

The invention is described by way of example with reference to the accompanying drawings in which:

FIG. 1 is a schematic circuit diagram of an analogue timer embodiment of the arrangement according to the invention, FIG. 2 shows voltage-time diagrams for the synchronising arrangement of the present invention, FIG. 3 shows the general wiring-diagram of a further embodiment of the arrangement according to the invention.

In FIG. 1, the current i1 flows from the current source Q1 to the capacitor C whereas the current source $\overline{Q2}$ (controllable by the output of the amplifier V1) causes a discharge current i2 via the capacitor. The two currents i1 and i2 are brought to the same current strength so that the voltage at the capacitor C remains constant per unit time.

During the run-through time of the first character in the set of characters of an information which passes through a reading device, the switch S1 is closed. As a result, there is generated by the current source Q3 the current i3 which has the tendency to discharge the capacitor C. The voltage at the capacitor C therefore changes according to the relationship.

$$dUc/dt = (i3 - i1)/C$$

since the current source Q2 after a negligibly small change of the voltage at the capacitor is already switched off via the amplifier V1. When the switch S1 is opened afresh by the reading device at the end of the run-through time of the first character, there is present at the capacitor C a voltage (relative to its initial voltage) which is directly proportional to the run-through time of the first character.

According to the above explanation the discharge of the capacitor C commences immediately thereafter according to the following relationship:

$$dUc/dt = -i1/C$$

When the output potential at the capacitor C is reached, the current source Q2 is switched on again through the amplifier V1 and, as a result, the voltage at the capacitor C thereafter again remains temporally constant.

In FIG. 2 the time course of the voltages at the capacitor C and at the output of the comparator K1 is in each case plotted against the time t. From the representation of FIG. 2 it can be seen that the total time tg (which elapses from the closing of the switch S1 until the renewed reaching of the output potential at the capacitor C) is proportional to the run-through time of the first character. The relationship: tg=t1+t2 applies, and the relationship $$t2/t1 = (i2 - i1)/i1$$

also applies.

When the two current sources Q1 and Q2 are correspondingly balanced, an adaption of the arrangement to the respective conditions of an information medium can therefore occur in dependence on the length of the first character t1 in relation to the total length tg.

Preferably, it may be provided that a signal with a rectangular wave shape be taken from a comparator K1 arranged downstream of the amplifier V1, which rectangular-wave signal determines the gate-opening time of the character meter and, in accordance with FIG. 2, is synchronised with the triangular-wave signal at the capacitor C. In one alternative embodiment, a timing member may also be used wherein, instead of the capacitor C, an induction coil is used. In this case the references to voltage may be replaced by references to current, the coil being "charged" to and "discharged" from a current proportional to the run-through time.

In a further alternative embodiment a digital/timing member may be used and a suitable arrangement is shown in FIG. 3. During the run-through time of the leading character in a set of characters, in accordance with FIG. 3 a meter Z1 is brought to upward counting with a speed f1 and this meter counts (after the run-through of the first character) back to the initial meter indication with a speed f2 which is usually different from f1.

The time t2 in which the meter counts back to the starting position is proportional to the time which the first character needs for running through the reading device. For this, the relationship $$t2/t1 = f1/f2$$

applies.

When the relationship f1:f2 is correspondingly set up, with this digital arrangement there can be carried out an adaption of the reading device to the speed of the characters which on an appropriate information medium are taken past the reading device.

In principle any suitable meter may be used, for example a forwards-backwards meter or an upwards-downwards meter or two different, separate meters may be used, one of which counts upwards during the run-through time t1 and t1' and t1" of the first character while the other meter, at the end of this run-through time of the leading character, is set to a starting position (proportional to the meter indication of the first meter) from which position it subsequently counts back at predetermined speed to, for example, the meter indication zero.

An alternative embodiment provides that a circuit be used in which, during the partial time t2 and t2' and t2", a meter in each case counts upwardly until a specific meter indication is reached, the counting frequency being influenced by the run-through time of the leading character through the reading device in such a manner that the following relationship applies:

$$f2 = K/t1$$

With the arrangements described above it can in each case be achieved that (through the use of a proportional timing member in which the length of a time signal delivered at the output is a fixedly settable multiple of the duration of an input signal which has obtained from the run-through time of the leading character in a set of characters) an automatic adaption of the gate-opening time for the character meter to the passage of the individual information set, can be effected. In this way there can also be determined exactly the point in time at which a signal can be given that the last character in a set of characters has been read, so that by this means an adaption to the speed of the information medium concerned is ensured. It may be noted that it does not matter whether the leading character in a set of characters corresponds in nature and duration to the other characters belonging to the set of information characters or (for reasons of safety or simplification) is different from the other characters of the information. It is also noted that by using the output signals of the scanning elements, which are in any case necessary for scanning the information, to obtain information on the run-through time of the leading character, the construction of the synchronising arrangement of the present invention is simplified and made even more economical.

In the arrangement according to FIG. 3 there is preferably arranged downstream of the meter Z1 a decoder D in which the output information of the meter Z1 is decoded and at the output of which a rectangular-wave signal which is representative for the time tg is supplied.

It will of course be appreciated that the basic mode of operation of the arrangememt of the present invention is not affected by whether positive or negative voltages are used so that references herein to charging and discharging refer to increases and decreases, respectively, in magnitude of voltage irrespective of its polarity.

What is claimed is:

1. An arrangement for synchronizing an information reading device with the relative speed of the movement between the reading device and an information medium, the information of which is formed by single characters of a character set having a fixed number of single characters in fixed spatial relationship characterized in that signal generating means are provided for producing an input signal with a time duration which is proportional to the passing time of the first character of the character set through the information device, and digital timing means are provided and operatively connected to said signal generating means whereby from said input signal for synchronizing the reading device the timing means produces an output signal, the time duration of which is a predetermined multiple of the time duration of said input signal, said arrangement further including at least one meter means which counts in a first direction with a first pre-determined speed from an initial meter indication and subsequently counts in a reverse direction with a second predetermined speed to said initial meter indication so that completion of said count in reverse direction indicates passage of the end of said character set past said information reading device.

2. The arrangement of claim 1 wherein said at least one meter means is a single forwards-backwards meter.

3. The arrangement of claim 1 wherein at least one meter means are first and second separate meters, said first meter counting upwardly during said speed determining passage time to a first value, said first value having a complement, and said second meter then counting upwardly from said complement to said initial meter indication.

4. The arrangement of claim 1 wherein said characters of said information medium comprise coding reflectors used in a photoelectronically controlled conveying or sorting, handling system.

5. The arrangement of claim 1 wherein said speed determining character is a leading character at said one end of said set of characters.

6. The arrangement of claim 1 wherein said speed determining character is an additional character inserted before said one end of said set of characters.

7. An arrangement for synchronizing an information reading device with the relative speed of the movement between the reading device and an information medium, the information of which is formed by single characters of a character set having a fixed number of single characters in fixed spatial relationship characterized in that signal generating means are provided for producing an input signal with a time duration which is proportional to the passing time of the first character of the character set through the information device, and analog timing means are provided and operatively connected to said signal generating means whereby from said input signal for synchronizing the reading device the timing means produces an output signal, the time duration of which is a predetermined multiple of the time duration of said input signal, said timing means being an induction coil arranged to have base current and to be charged from said base current in a predetermined manner during said passing time of the first character, and then discharged in a predetermined manner to said base current so that completion of the predetermined discharge to said base current indicates passage of the end of said character set past said information reading device.

* * * * *